Figure 1:
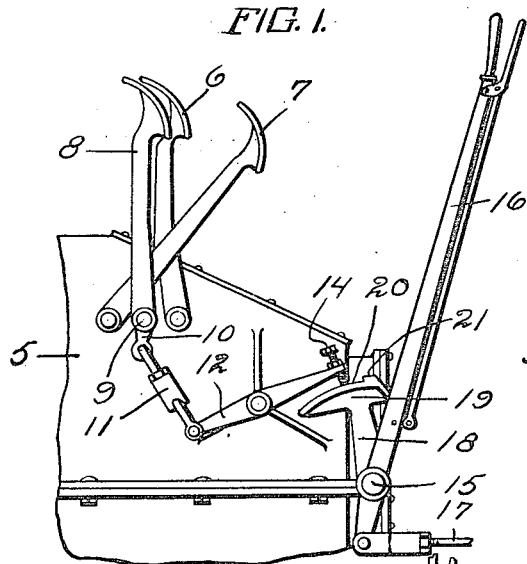

F. C. ALLEN.
CLUTCH RELEASE FOR FORD AUTOMOBILES.
APPLICATION FILED AUG. 12, 1914.

1,130,560.

Patented Mar. 2, 1915.

Witnesses
R. J. Williams.
J. M. Jester

Inventor
F. C. Allen,
By
Attorney

UNITED STATES PATENT OFFICE.

FRANK C. ALLEN, OF MONON, INDIANA.

CLUTCH-RELEASE FOR FORD AUTOMOBILES.

1,130,560.　　　Specification of Letters Patent.　　Patented Mar. 2, 1915.

Application filed August 12, 1914. Serial No. 856,417.

*To all whom it may concern:*

Be it known that I, FRANK C. ALLEN, a citizen of the United States, residing at Monon, in the county of White, State of Indiana, have invented certain new and useful Improvements in Clutch-Releases for Ford Automobiles; and I do hereby declare the following to be a full, clear, and exact description of the invention, such as will enable others skilled in the art to which it appertains to make and use the same.

This invention relates to clutch control devices, particularly to the clutch control devices of Ford automobiles.

It is well known that on Ford automobiles the foot pedal which operates the clutch is moved into its neutral or inoperative position when the hand brake lever is pulled back entirely or about half way. If the operator wishes to hold the clutch pedal in its neutral or inoperative position so that he may have both feet free for the manipulation of the reverse and brake pedal, and at the same time to release the band brakes on the wheels, it is necessary to move the hand brake lever forwardly to the proper extent. However if the hand lever is pressed too far forwardly, the rock shaft lever will slip entirely under the screw which extends through the rocker arm extending from the transmission case and connected with the clutch foot pedal, thereby allowing the rear end of the rocker arm to move down to its fullest extent thus causing the clutch to be thrown into high gear. At present the only way in which the operator can determine when he has moved the hand brake lever far enough forward to release the wheel brakes while at the same time not move it too far forward to allow the clutch to slip into high gear, is by the "feel" of the foot clutch lever. This method and operation is therefore indefinite and uncertain and especially annoying to and difficult of accomplishment by an inexperienced operator. This is especially true when the operator desires to back the car. In backing, it is necessary that the clutch lever be held in its neutral position while the reverse and brake pedals are operated. While it is true that the clutch may be held in neutral position by throwing the clutch lever pedal half way forward with one foot while the reverse and brake pedals are operated by the other foot, at the same time when backing the car in a garage or other limited space, it is desirable that the clutch be held positively in its neutral position by the action of the hand brake lever so that the operator may use one foot for the reverse pedal and the other foot for the brake pedal. This latter alternative is much safer than the former, especially when an inexperienced operator is handling the car for the reason that he has better control as will be obvious, however the objection previously described as to the uncertainty in determining the proper position of the hand brake lever by feeling only is repeated.

The object of the present invention resides in the provision of a stop on the rock shaft lever engaging against the screw on the rear end of the rocker arm to prevent a hand brake lever from being moved so far forwardly as to let the rocker arm slip from the rear end of the rock shaft lever with the resultant throwing of the clutch into high gear.

Another object is the provision of means of this character which will not interfere with the ordinary provision of the car.

With these objects and advantages in view, my invention consists in the novel construction and arrangement to be hereinafter more fully described and claimed, and illustrated in the accompanying drawing, in which—

Figure 2:
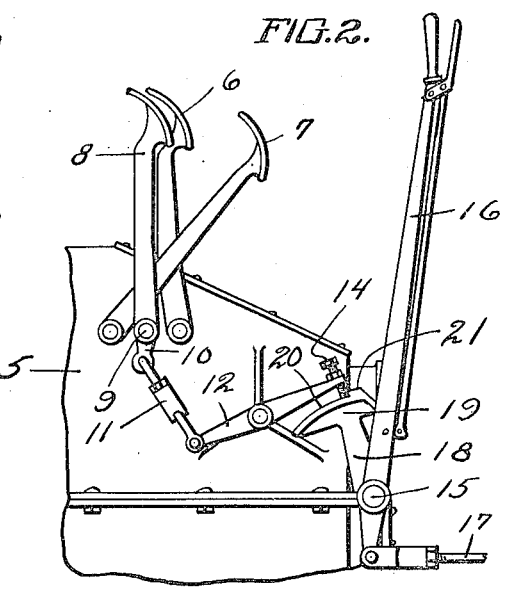
Figure 3:
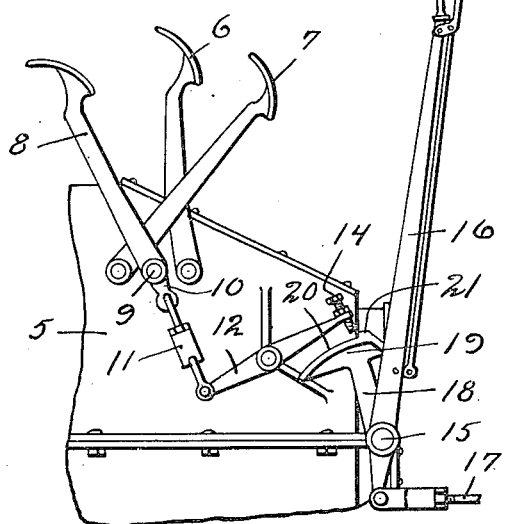
Figure 4:
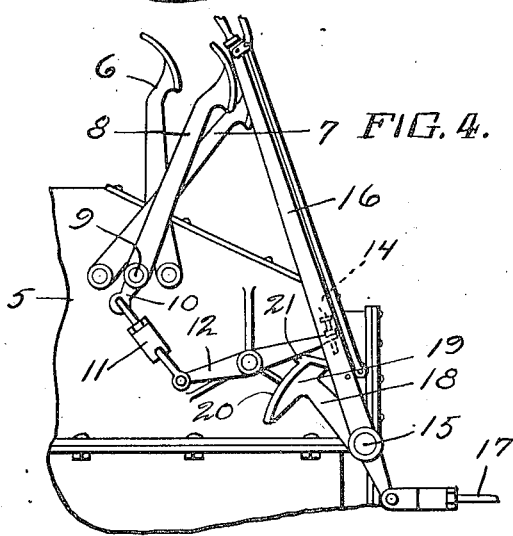
Figure 5:
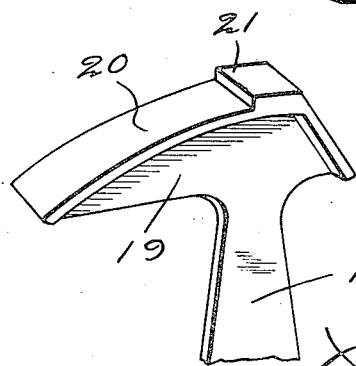

Figure 1 is a side elevation of a fragment of the left side of the frame and the transmission casing with its associating parts of a Ford automobile, showing my device applied thereto, and showing the hand brake lever and rock shaft lever in their rearmost positions. Fig. 2 is a similar view showing the handbrake lever moved forwardly with the rockshaft lever holding the clutch in its neutral position. Fig. 3 is a similar view showing the clutch foot pedal pressed forwardly, throwing the clutch into low gear and elevating the rear end of the rocker lever, thereby permitting the passage of the rocker shaft lever thereunder. Fig. 4 is a similar view showing the hand brake lever thrown entirely forward, the clutch foot lever in its rearmost position with the clutch in high gear. Fig. 5 is a perspective view of the rock shaft lever detached and having my member thereon.

Referring more particularly to the drawing the numeral 5 designates the transmission case of a Ford automobile having the brake and reverse pedals 6 and 7 mounted thereon, and having the clutch foot pedal 8 journaled as at 9 and carrying an arm 10 connected by an adjustable link 11 with the forward end of the rocker lever 12, operating the clutch shaft. The rear end of the rocker lever 12 has a screw 14 extending therethrough and therebelow.

The numeral 15 designates a rock shaft turned by a hand brake lever 16 secured thereon and operating the brake rods 17.

The numeral 18 designates the rock shaft lever which is carried upon the rock shaft 15 and which has its head 19 shaped as shown, forming a cam surface 20.

The parts just described are the regular and ordinary parts of the control of a Ford automobile. My invention consists in the provision of a projection 21 formed either integrally upon the head 19 or formed as an attachment and secured thereon. The hand brake lever 16 being in its rearmost position with the brakes set as shown in Fig. 1, the operator cranks his motor. After the engine is started the operator takes his seat within the car and pushes the lever 16 forwardly as shown in Fig. 2. The screw 14 in the rear end of the rocker lever 12 will be engaged by the cam surface 20 of the lever 18 and the clutch will be held in its neutral position. The projection 21 will also engage the screw 14 and prevent the lever 18 from passing entirely under the lever 12 and letting the clutch slip into high gear. The operator may then start the car by pressing the clutch foot pedal 8 forwardly, thus throwing the clutch into low gear as shown in Fig. 3. In order to get into high gear, it is then necessary to shove the brake lever 16 forwardly all the way, this being permitted by virtue of the fact that when the clutch is thrown into low gear the rear end of the rocker lever 12 is elevated sufficiently that the projection 21 on the lever 18 may pass under the screw 14, as shown in Fig. 3. By letting the clutch foot pedal 8 come all the way back, the clutch will be thrown into high gear, as shown in Fig. 4.

The automobile is stopped in the usual manner, that is, by pressing the foot lever 8 half way forwardly to throw the clutch in its neutral position and then pressing the brake lever 6 forwardly. The automobile should be locked by pulling the hand brake lever 16 rearwardly, thus setting the band brakes.

If it is desired to back the car, it should be first brought to a stop as described, after which throwing the lever 16 forwardly will release the brakes and at the same time hold the clutch in its neutral position by virtue of the engagement of the projection 21 with the screw 14. The backing of the car is then controlled by the movement of the reverse pedal 7 and the brake pedal 6, the operator having both feet free to control these pedals.

The advantage and utility of my device will become apparent from the foregoing description and a study of the drawing, it being obvious that especially in the case of an inexperienced driver, greater ease of operation and particularly greater safety is attained by the use of my device.

Having thus described my invention, I claim:

In combination with the clutch throwing lever of a Ford automobile, comprising a pivoted foot lever, an arm thereon, a link pivotally connected with said arm, a pivoted rocker arm pivotally connected with said link and a screw extending through the rear end of said rocker arm and projecting downwardly therebeyond; a clutch release lever mounted upon the hand brake lever actuated rock shaft, the upper surface of said release lever engaging the end of said screw, and a projection on the upper face of said release lever engaging the side of said screw, for preventing forward movement of said hand brake lever with the resultant release of the engagement of said screw with said release lever and the throwing of the clutch into high gear, the engagement of said projection with said screw being released by the forward movement of said pivoted foot lever to elevate said screw out of engagement with said projection and the continued forward movement of said hand brake lever to rock said release lever out of the path of said screw.

In testimony whereof, I affix my signature, in the presence of two witnesses.

FRANK C. ALLEN.

Witnesses:
B. H. BROWN,
JOHN A. SMITH.